United States Patent [19]
Lauterbach

[11] 3,964,343
[45] June 22, 1976

[54] COMBINATION MEANS FOR RIGIDLY ATTACHING SHOE TO A PEDAL FOR A FOOT-DRIVEN CRANK-OPERATED MACHINE

[76] Inventor: James H. Lauterbach, The Carriage House, 90 Gregory Ave., West Orange, N.J. 07052

[22] Filed: June 9, 1975

[21] Appl. No.: 585,187

[52] U.S. Cl. .............................. 74/594.6; 74/594.4; 272/73
[51] Int. Cl.² ...................... G05G 1/14; B62M 3/08
[58] Field of Search ...................... 74/594.6, 594.4; 128/25 R; 272/73, 79 R

[56] References Cited
UNITED STATES PATENTS

| | | | |
|---|---|---|---|
| 550,409 | 11/1895 | Hanson | 74/594.6 |
| 588,038 | 8/1897 | Tudor | 74/594.6 |
| 598,325 | 2/1898 | McIntyre | 74/594.6 |
| 3,788,163 | 1/1974 | Gause et al. | 74/594.6 |

FOREIGN PATENTS OR APPLICATIONS

| | | | |
|---|---|---|---|
| 20,289 | 12/1895 | United Kingdom | 74/594.6 |

Primary Examiner—Samuel Scott
Assistant Examiner—F. D. Shoemaker
Attorney, Agent, or Firm—Lackenbach, Lilling & Siegel

[57] ABSTRACT

This invention provides a combination means for quickly and rigidly securing the foot of an operator to a pedal of a bicycle, or the like. The combination means comprises pedal-gripping means adapted to be secured to the sole of the shoe of an operator, a pedal having a generally prismatic configuration and comprising two polygonal end surfaces and at least three substantially mutually congruent side faces. Each side face having shoe-gripping means formed thereon. One end face of the pedal having means for being, preferably, rotatably connected to a crank. The shoe-gripping means and the pedal-gripping means are mutually lockably interengageable so as not to be disengageable by any normal movement of the foot during pedalling.

10 Claims, 10 Drawing Figures

COMBINATION MEANS FOR RIGIDLY ATTACHING SHOE TO A PEDAL FOR A FOOT-DRIVEN CRANK-OPERATED MACHINE

This invention is directed generally to a combination means for quickly and rigidly securing the foot of an operator to a pedal for a bicycle or the like, or other foot-driven, crank-operated machinery.

The art has long recognized the desirability of increasing the period during which force can usually be applied to a pedal of a velocipede, or bicycle, or other crank-driven machinery, by the operator to propel the machine. When utilizing the conventional flat pedal, the rider is only able to exert a driving force during an arc of pedal movement of less than 180° of each complete revolution of the crank axle, and the maximum force is exerted only through an arc of less than about 90°. To increase the period during which the propelling force is applied, the art has provided various means for more or less rigidly attaching the foot, by way of the shoe, to the pedal, so as to enable the operator to develop work, or exert driving force, through the pedal to the crank even when the pedal is moving upwardly toward its apogee, or uppermost, position, as well as when it initially passes through such apogee point and begins its downward movement.

A variety of devices proposed for accomplishing this rigid securement include, for example, strap and/or clip arrangements that are attached to the pedal and extend over the top of the toe and sometimes the instep of the shoe worn by an operator. Such devices are shown, for example, in U.S. Pat. No. 351,880, to Merrill. Although such devices have the advantage of being useful regardless of the shoe worn by the wearer, they have a disadvantage of being bulky, heavy, and thus increasing not only wind resistance but also the weight of the crank for the operator. Although this is of less significance for stationary machinery, it is of great importance for the bicycle rider, especially the operator of the light-weight bicycles used in racing, where great effort is undertaken to pare as much weight as possible from the machine.

A variety of devices have also been proposed for connecting a pedal gripping means attached to the bottom, or sole, of the shoe of the operator to a corresponding, or mating, portion on the pedal face. Such devices are shown for example, in U.S. Pat. No. 598,325 to McIntyre. McIntyre however, requires that the foot be engaged by moving forwardly onto the pedal and thus is disengaged by a rearward movement, a movement which is not unusual in bicycle riding. Hanson, in U.S. Pat. Nos. 595,388 and 550,409 discloses a similar arrangement where, however, the connection between the plate attached to the bottom of the shoe and the pedal is made by twisting the shoe in a rotating motion around an axis perpendicular to the pedal.

French Pat. No. 967,277 and British Pat. No. 16,829 describe means for rigidly connecting a shoe to a bicycle pedal utilizing a plate connected to the sole of the shoe and having lugs extending in a direction transverse to the longitudinal axis of the foot. The pedal has mating portions extending parallel to the longitudinal axis of the pedal and the lugs on the shoe are permitted to engage the mating portions on the pedal. A similar device is shown in French Pat. No. 1,030,485. See also for generally related type of pedal shoe connectors, U.S. Pat. Nos. 458,608 and 3,788,163 and British Pat. No. 18,310.

All of the above patents describe pedals having two major faces, i.e. which can be utilized for the application of force, and which include the mating parts. In many cases however, only one face includes the mating portion for connection to the shoe. In these cases, a problem arises when it is necessary to attach the shoe to the pedal, in that it is not always easy to match the shoe to the pedal when the pedal is not in the proper attitude, facing upwardly. This problem has been in the past solved by the art by utilizing for example, balancing attachments of the types shown in U.S. Pat. No. 543,844. These however, unnecessarily increase the weight of the pedal and its complexity, all of which are contrary to the express intent of bicycle users and manufacturers.

The present invention provides a means for substantially rigidly securing the foot of an operator to a pedal wherein the pedal can be secured substantially regardless of the attitude of any particular face of the pedal; that is, substantially every face is capable of being relatively substantially rigidly secured to the foot of the operator. Furthermore, the preferred method of securement, in accordance with the present invention, only requires that the foot be directly placed, moving in a vertical direction, upon the pedal, and the foot moved laterally, i.e. outwardly, along the pedal from the crank to lock the foot to the pedal.

In accordance with the present invention, a combination means is provided for rigidly securing a foot of an operator to a pedal for a foot-driven cycle, or a velocipede, or the like machinery, the combination comprising:

a. a pedal having a substantially prismatic configuration, or its equivalent, and comprising two polygonal end surfaces and at least three substantially mutually congruent side faces extending transversely and between the end faces, b. connecting means, at least at one end face of the pedal, adapted for being rotatably connected to a crank, c. pedal connector means adapted to be secured to the sole of a shoe, and d. shoe connecting means formed on each side face of the pedal. The pedal connector means and the shoe connector means being mutually lockably interengageable.

In a preferred embodiment of the present invention, the pedal comprises an odd number of side faces, and most preferably each side face is a parallelogram, optimally a rectangle, i.e. the end faces are odd-sided polygons in a plane substantially perpendicular to the longitudinal axis of the pedal.

In yet another preferred embodiment of the present invention, the pedal connector means secured to the sole of a show comprises a female connector member and the shoe connector means on each side face of the pedal comprises a male connector means. Although the reverse can be utilized, i.e. where the female connector is located on each surface of the pedal and a male connector is secured to the sole of a shoe, this results in a generally more bulky and less easily used combination. The weight of the pedal, for equal strength securing means, would be substantially increased.

In a preferred type of connector means, the pedal includes segmented lug portions extending outwardly from each side face thereof and the means secured to a shoe comprises a segmented female portion, adapted to interengageably mesh with the lugs of the pedal, comprising overhanging portions or flanges, beneath which the lugs can be guided and restrained to result in the locking of the shoe to the pedal.

Yet another preferred aspect of the present invention is the provision for retaining means preventing lateral, or outward movement of the shoe beyond the pedal, and thus maintaining the shoe and pedal in an interengaged, locked condition; and further, provision for a releasable retaining means at the inboard face of the pedal, i.e. that face containing the connector to the crank, which can prevent inward lateral movement and thus prevent release of the shoe from the pedal without first unlatching the locking means.

The following drawings and verbal description thereof, set forth preferred embodiments as examples of the invention described and claimed herein. The drawings merely reflect the preferred embodiments and are not intended to be exclusive of the full scope of the invention.

Figure 2:
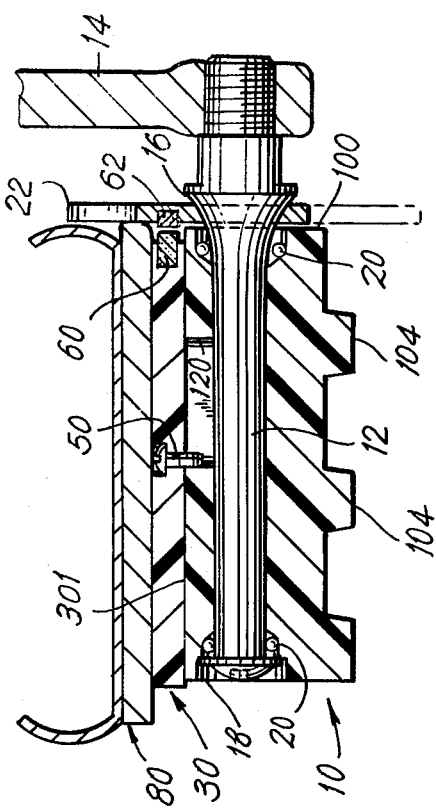
FIG. 2 is an elevation in cross section taken along lines 2—2 of FIG. 1.
Figure 3:
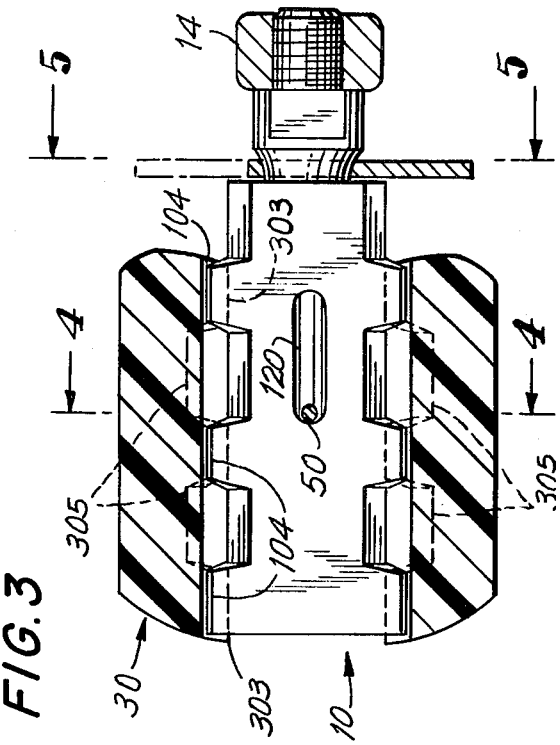
FIG. 3 is a cross-sectional view taken along lines 3—3 of FIG. 1.

Referring now to the drawings wherein likereferenced characters designate like or corresponding parts throughout the several views, there is shown in FIGS. 1 through 5 and FIG. 7 a preferred embodiment of the principles of the present invention.

A pedal, generally designated by the numeral 10, is rotatably supported about shaft 12. The shaft 12 is, in the embodiment shown, threadedly secured to a crank 14. The distal end of the crank 14 can be affixed to the drive system of, for example, a chain-driven bicycle, or the like, in any conventional manner. The exact mechanism to which the crank 14 is coupled and the manner in which the coupling is accomplished is no part of this invention and is thus omitted from the drawings and this description in the interest of brevity.

The pedal 10 is maintained in its operative position between the flange 16 on the shaft 12, and the lock ring 18 attached at the outer extremity of shaft 12. Bearing races 20 are formed at each end of the pedal 10 and support the pedal for rotation about the longitudinal axis of the shaft 12. The exact details of the bearings and races are omitted, again in the interest of brevity, as they are conventional and form no part of this invention.

An eccentric locking nut 22 is snugly, but rotatably fitted about the shaft 12; an annular portion of the nut 22 is in contact with the inner end surface 100 of the pedal 10.

Figure 8:
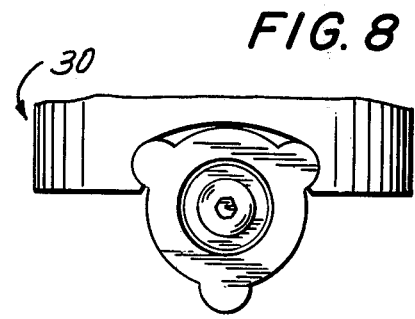
FIG. 8 is a side elevation view of another alternative embodiment of the present invention.
Figure 9:
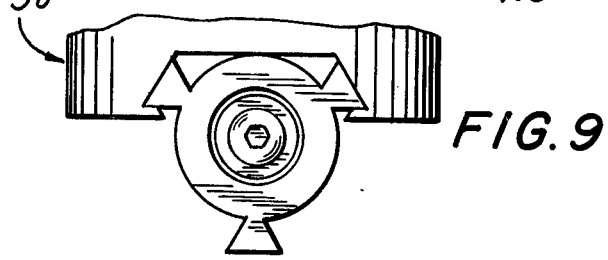
FIG. 9 is a side elevation view of yet another alternative embodiment of the present invention.

The pedal 10 is depicted in the form of a regular triangular prism, having three side faces 101. The side faces are all mutually substantially congruent and are all, in plan outline, substantially rectangular. The sides of each rectangular face are segmentally bevelled, or chamferred, to form alternating segments of bevelled surfaces 103 and corner vertices 104. The alternating sequence of bevelled and unchamferred corners presents the appearance (in plan view) of lugs, or teeth. Equivalent configurations (which have more complex shapes and therefore are more complex to form) which yield the same results are shown in FIGS. 8 and 9. The embodiments of FIGS. 8 and 9 are the equivalent of the triangular prism shown for FIG. 7. Similarly as explained above, any generally prismatic shape can be used for forming the pedal; in place of a three-sided device, e.g. a five-sided or nine-sided pedal can be utilized. The pedal, however, as the number of sides increases, becomes undesirably bulky. For that reason, although the greater the number of congruent sides the easier it is to apply the shoe to the pedal without being concerned for the attitude of the pedal, i.e. as to whether a face, or side surface is substantially horizontal, the advantage of more than three sides is minimal. For this reason, the three-sided, or triangular, prism is most desirable. Although there would be no difficulty with forming the pedal wherein the end surfaces 100 and 110 are other than normal to the side surfaces, again there is no advantage, other than styling, for doing so.

The eccentric locking nut 22, can be so snugly fitted to the shaft 12, and against the end surface 100 of the pedal 10, as to remain substantially in place after it has been moved to a desired position due to friction.

An elongated slot, defined by interior surface 120, is formed through each side surface 101 of the pedal 10, intermediate two of the chamferred, or bevelled, portions of the edges of each side face 101 in the particular embodiment shown.

The pedal connecting member, generally indicated by the numeral 30, is shown in FIGS. 1 to 4 and 5 as being secured to the bottom of the sole of a shoe, generally indicated by the numeral 80. The pedal connector 30, is a block of material extending slightly less than the width of the shoe sole 80 and having a cut-out portion or slot, extending substantially entirely across the width of the block, i.e. in a direction transverse to the longitudinal axis of the shoe 80, adapted to mate with the congruent side surfaces 101 of the pedal 12. The slot formed transversely across the width of the block 30 is, in cross-section, a dovetail mortise as illustrated in the drawings of FIGS. 1, 3, 4, 5 and 6. The portion of the the three-sided pedal which mates, or interengages with the slot is in the form, or the equivalent, of a dovetail tenon.

The block 30 can be formed as an integral member or, alternatively but with equal effectiveness, can be formed in two or more parts bolted or otherwise joined rigidly together. The integral element can be formed by molding or alternatively by machining a solid block. The slot, as shown, is undercut so as to permit the interengagement between the undercut sides of the slot and the non-chamferred corners 104 of each of the congruent faces 101 of the pedal. The width of the transverse slot through the block 30 is greatest at the inner-most portion, i.e. as defined by surface 301 (preferably, just slightly greater than the width of the pedal 10, measured between the outer edges 104) and narrowest at its outer surface 302. To permit ready inter-engagement between the pedal 10 and the block 30, the undercut upper edges 303 of the block 30 are also notched in a manner complementary to that of the pedal; the length of the notched-out portions 305 along the outer edges 303 of the slot in the block 30 is preferably substantially the same as the length of the non-chamferred portions of the edges 104 of the pedal 10. The angle formed between the interior surface 301 and the interior side surface 302 (extending from the top edge 303 to the interior surface 301), should be substantially about the same as, the angle formed by the vertices 104 of the pedal 10.

Figure 10:
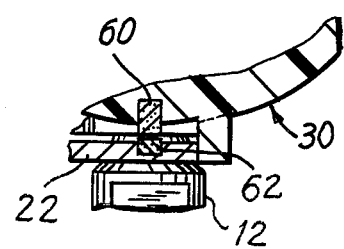
FIG. 10 is a fragmented view, in cross section, taken along lines 10—10 of FIG. 5.

A restraining member, in this case pin 50, extends downwardly from the horizontal interior surface 301 and is so positioned on that surface as to extend into the longitudinal slot 120 in the pedal 10 when the block 30 and the pedal 10 are interengaged. Ball means, such as a spring loaded detent button 60 extends outwardly from and is reciprocally longitudinally connected to the side of the block 30. As shown in FIGS. 2 and 10, when the eccentric locking nut 22 is in its vertical position, the biased detent button 60 is in contact with the detent means 62 on the locking nut 22 and serves to retain the locking nut in position.

In operation, the embodiment of this invention depicted in FIGS. 1 through 5 acts as follows. The pedal 10, when attached to a bicycle crank 14, is positioned such that a side surface 101 is in a horizontal attitude, i.e. facing vertically upwardly; the shoe is placed directly downwardly upon the pedal such that the block 30, secured to the bottom of the sole of the shoe, mates with the pedal i.e. the unchamferred vertices 104 mate with the notched-out portions 305 of the undercut edges 303 of the transverse slot through the block 30. In this position, the inner edge of the sole of the shoe is extended beyond the edge 100 of the pedal 10 proximal the crank 14. It is necessary that there be sufficient clearance between the crank 14 and the end of the pedal 10 to permit this mating between the block 30 and the pedal 10. The pin 50, in this position, extends into the slot 120 in the pedal 10, and is at a position in the slot towards the end proximal the crank 14, i.e. the end opposite from that shown in FIG. 3. Similarly, the interior surface 301 of the block 30 is in contact with the face 101 of the pedal. In order to lock the shoe in position with the pedal, it is caused to move transversely outwardly to the position shown, for example, in FIGS. 2 and 3 where the pin 50 is at the distal end of slot 120 and the block and sole of the shoe are substantially directly above the pedal 10. As shown, the non-chamferred corners 104 of the pedal in the locked position are beneath the overhanging non-cutaway portions of the edges 303. Further outward movement of the shoe and the block 30 is prevented by the retaining pin 50 abutting against the interior surface 120 of the slot.

To further secure the foot to the pedal, it is possible, if desired, to rotate the eccentric nut 22 about the shaft 12 such that the large portion of the nut is pointing upwardly, and presses against the interior side of the shoe and block 30. As shown, the nut 22 is held in position by the detent button 60 acting against the detent means 62. It has been found that this locking effect utilizing the eccentric nut 22 is useful when, for example, racing.

Figure 6:
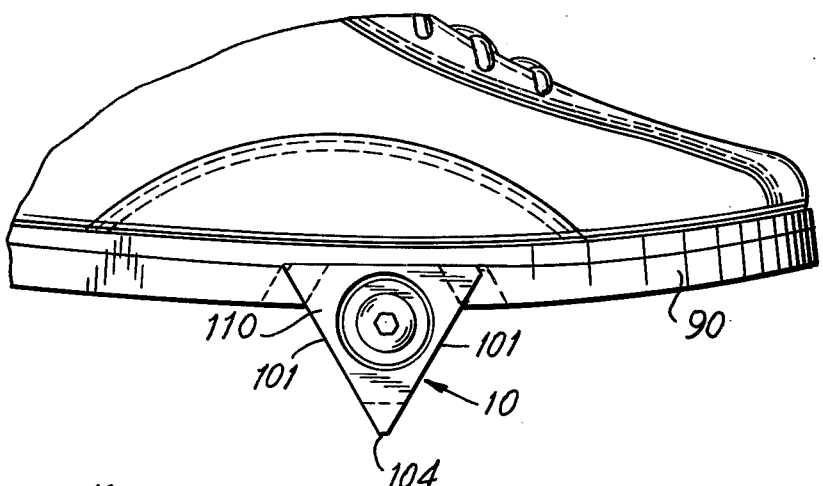
FIG. 6 is a side elevation view of an alternative embodiment of FIG. 1, wherein the attachment is built into the sole of the shoe.
Figure 7:
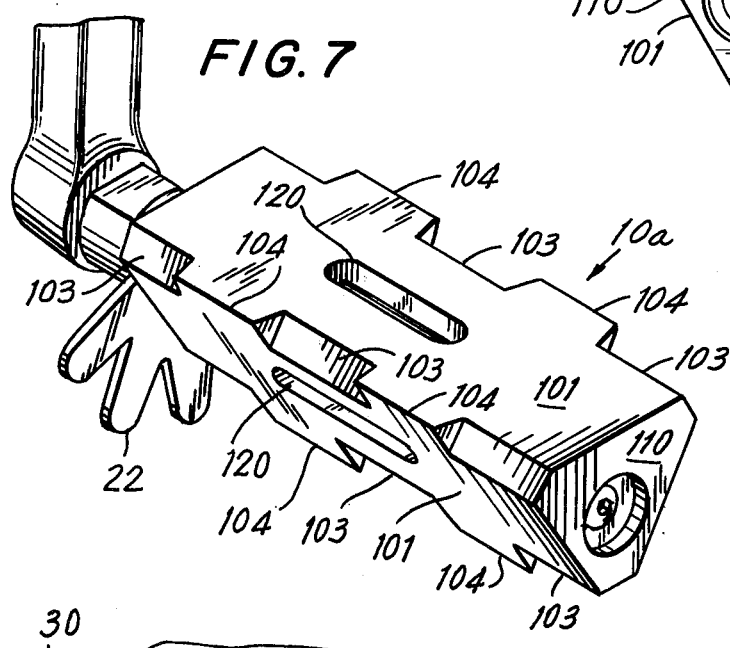
FIG. 7 is a perspective view of a slightly modified preferred embodiment of a pedal in accordance with the present invention.

The embodiment of FIG. 6 avoids the awkwardness of a protrusion below the sole of a shoe by increasing the thickness of the sole and forming the transverse slot directly in the sole. The same configurations of the slot are obtainable and as shown in FIG. 6, the sole consists of two pieces, the outer piece 90 being formed in two pieces, the central ends of the two pieces being bevelled as shown in the drawing, and notched, as in FIG. 3.

It is to be understood that the exact configuration of the pedal and of the block slot are not crucial, it is only necessary that they be easily mated and easily interlocked.

The block and the pedal can be formed of metal if desired, but are preferably formed of a strong, impact-resistant polymer plastic material such as polycarbonate or polypropylene.

Referring to the embodiment of FIG. 10, the detent for the locking nut 22 may be a magnetic element which attracts and holds the ferromagnetic nut 22 in the desired position indicated in FIG. 10. However, alternatively any other type of detent mechanism can be utilized including, if desired, a spring loaded plunger and detent of conventional configuration. A similar detent mechanism may likewise be used in lieu of the retaining member or pin 50 and the slot 120 for locking the shoe in position with the pedal.

The segmented configuration of the lugs and overhanging portion of the pedal and shoe piece respectively, are preferred because they enable the operator to apply the shoe to the pedal by pressing directly downwardly without requiring an extended distance between the proximal end 100 of the pedal 10 and the crank shaft 15. If a single overhanging ledge having the same total length as the segmented edges 303 and a continuous unbevelled corner having the same total length as the segmented lugs 104, were to be utilized, the distance between the end of the pedal and crank would perhaps be as much as half the width of the shoe, or else the foot would have to be twisted in order to mesh with the pedal. The pedal 10A of FIG. 7 differs from the pedals shown in FIGS. 1 through 4 in that it has three bevelled portions 103 and two lugs 104, or unbevelled corners, instead of two bevelled portions 103 and three lugs 104. If desired, a greater or lesser number of alternating lugs and bevelled portions can be provided on a pedal, and, if desired, an equal number of lugs and bevelled portions can be provided.

Figure 1:
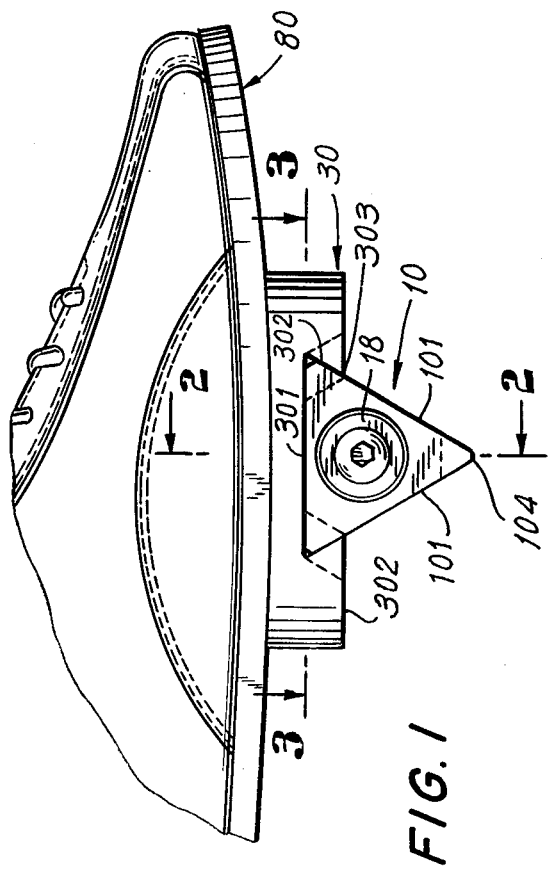
FIG. 1 is a side elevation view showing the invention in the context of a wearer's shoe.
Figure 4:
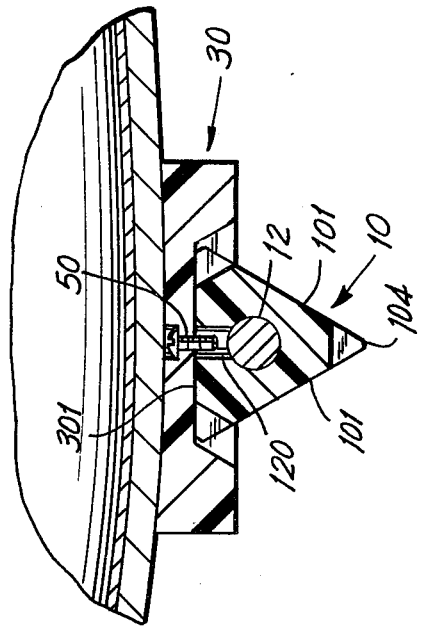
FIG. 4 is a cross-sectional view taken along lines 4—4 of FIG. 3.
Figure 5:
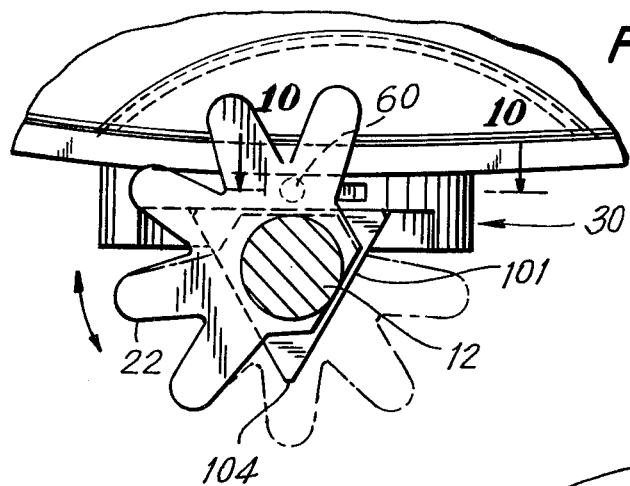
FIG. 5 is a cross-sectional view taken along lines 5—5 of FIG. 3.

In order to provide for some adjustment relative to the interengagement between the pedal 10 and the block 30, it may be desirable to fabricate the block 30 as noted hereinbefore in a plurality of parts, namely, two or more pieces, separated along a part line or separation line of the block 30, such as section line 3—3 of FIG. 1. By such construction, shimming means, in the form of gasketing or other washer-like "build-up" inserts (not shown) may be positioned between the two angular surfaced blocks forming the dovetail mortise and the remainder flat block secured to the sole or forming part of the sole so as to enable adjustment of the fit between the dovetail tenon (male element) of the pedal and the dovetail mortise (female element) or the recess surface means of the pedal connector means.

The invention has been hereinabove described and depicted in what is at this time conceived to be by the inventor, the preferred embodiment. It is recognized, however, that equivalent designs can be utilized within the scope of this invention, which is not to be limited to the details disclosed above, but in accordance with the following claims.

The patentable embodiments of this invention which are claimed are as follows:

1. Combination means for rigidly securing the foot of an operator to a pedal for a foot-driven cycle, or the like, the combination comprising:
    a. a pedal having a substantially prismatic configuration, comprising two polygonal end surfaces and at least three substantially mutually congruent side faces extending transversely to and between the end faces;
    b. connecting means, at least at one end face of the pedal, for rotatably connecting the pedal to a crank;
    c. pedal connector means adapted to be secured to the sole of a shoe; and
    d. shoe connecting means formed on each side face of the pedal, the shoe connecting means being mutually lockably interengageable with the pedal connector means.

2. The combination of claim 1, wherein the pedal comprises an odd number of side faces.

3. The combination of claim 1, wherein the pedal comprises between three and five side faces.

4. The combination of claim 1, wherein the pedal comprises three side faces.

5. The pedal of claim 1, wherein the pedal connector means comprises a female interlocking means, and the shoe connector means comprises male connector means.

6. The combination of claim 5, wherein the longitudinal edges of each side face of said pedal comprises alternating bevelled and non-bevelled corner portions forming segmented lugs, and wherein the pedal connector means comprises a recess surface means having overhanging rim portions interengageable with the segmented lugs of said pedal.

7. The pedal of claim 5, comprising in addition, restraining means for preventing movement of the pedal connector means in an outward direction along the length of the pedal, whereby inadvertent disconnection by mutual sliding between the pedal and the shoe is prevented.

8. The combination of claim 6, comprising in addition, a releasable retaining means moveably connected to the pedal and adapted to be placed in a first position whereby interengagement between the pedal connector means and shoe connector means is obtainable, and a second position wherein disengagement of the shoe connector means and the pedal connector means is prevented by limiting movement of the shoe connector means along the length of the pedal.

9. The combination of claim 7, wherein said restraining means comprises interengageable members connected to the pedal connector means and the shoe connector means respectively, one of such members protruding outwardly from one means extending towards the other means, and the second of such members being a female member capable of enclosing and restraining said first member.

10. The combination of claim 8, wherein the releasable retaining means is rotatably secured to the pedal at the first end thereof, and is rotatably moveable between the locking and open positions.

* * * * *